(12) United States Patent
Lee

(10) Patent No.: US 11,715,964 B2
(45) Date of Patent: Aug. 1, 2023

(54) CHARGING DOCK FOR AN INTELLIGENCE LOUDSPEAKER BOX

(71) Applicant: Cheng Uei Precision Industry Co., Ltd., New Taipei (TW)

(72) Inventor: James Cheng Lee, La Habra, CA (US)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 337 days.

(21) Appl. No.: 17/147,500

(22) Filed: Jan. 13, 2021

(65) Prior Publication Data

US 2021/0305823 A1    Sep. 30, 2021

(30) Foreign Application Priority Data

Mar. 24, 2020   (CN) .......................... 202020388922.5

(51) Int. Cl.
*H01M 10/46* (2006.01)
*H02J 7/00* (2006.01)
*H02J 50/10* (2016.01)
*H04R 3/00* (2006.01)

(52) U.S. Cl.
CPC ............ *H02J 7/0044* (2013.01); *H02J 50/10* (2016.02); *H04R 3/00* (2013.01); *H02J 2310/22* (2020.01); *H04R 2420/07* (2013.01)

(58) Field of Classification Search
CPC ...... H02J 7/0044; H02J 7/0042; H02J 7/0045; H02J 50/005; H02J 2310/22; H02J 50/10; H04R 2420/07; H04R 3/00; H04R 2225/31; H04R 1/1025
USPC ................................ 320/103, 107, 114, 115
See application file for complete search history.

(56) References Cited

U.S. PATENT DOCUMENTS

2020/0221198 A1 *  7/2020  Pupecki ................ H02J 7/0044

FOREIGN PATENT DOCUMENTS

WO    WO-2023278485 A1 *  1/2023  .......... H02J 7/00032

* cited by examiner

*Primary Examiner* — Edward Tso
(74) *Attorney, Agent, or Firm* — Lin & Associates Intellectual Property, Inc.

(57) ABSTRACT

A charging dock applied in an intelligence loudspeaker box, includes a shell, a battery module and a charging cable. The intelligence loudspeaker box has a charging hole. A top surface of the shell is recessed downward to form a receiving space equipped with a pogo pin connector. The intelligence loudspeaker box is received in the receiving groove. One end of the pogo pin connector is connected to the intelligence loudspeaker box. The battery module is disposed in the shell. The battery module includes a circuit board. A top surface of the circuit board is equipped with a docking element. The docking element is connected to the other end of the pogo pin connector. One end of the charging cable is connected to the charging hole, and the other end of the charging cable is connected to a power unit.

15 Claims, 10 Drawing Sheets

CHARGING DOCK FOR AN INTELLIGENCE LOUDSPEAKER BOX

CROSS-REFERENCE TO RELATED APPLICATION

The present application is based on, and claims priority from, China Patent Application No. 202020388922.5, filed Mar. 24, 2020, the disclosure of which is hereby incorporated by reference herein in its entirety.

BACKGROUND OF THE INVENTION

1. Field of the Invention

The present invention generally relates to a charging dock, and more particularly to a charging dock applied in an intelligence loudspeaker box.

2. The Related Art

Nowadays, an electronic product gradually tends to be miniaturized on account of a process development of a current semiconductor industry. A portable intelligence loudspeaker box has been developed for making a user who uses the portable intelligence loudspeaker box play musics anytime. The intelligence loudspeaker box usually has a battery and a charging device, so that the intelligence loudspeaker box can be used at any time.

However, the charging device is cooperated with the portable intelligence loudspeaker box is inconvenient, the user has to carry a bulky charging cable. Furthermore, the charging device is limited by a length of the charging cable, the charging device is only fastened to one place by the charging cable. Therefore, the charging device appears to be used inconveniently.

Thus, it is essential to provide an innovative charging dock, the innovative charging dock is applied in an intelligence loudspeaker box.

SUMMARY OF THE INVENTION

An object of the present invention is to provide a charging dock adapted for being applied in an intelligence loudspeaker box. The intelligence loudspeaker box has a charging hole. The charging dock includes a shell, a battery module and a charging cable. An inside of the shell defines an accommodating space. A top surface of the shell is recessed downward to form a receiving space. The receiving space is equipped with a pogo pin connector. The intelligence loudspeaker box is received in the receiving space. One end of the pogo pin connector is connected to the intelligence loudspeaker box. The battery module is disposed in the accommodating space of the inside of the shell. The battery module includes a circuit board. A top surface of the circuit board of the battery module is equipped with a docking element extending upward and projecting beyond the top surface of the circuit board. The docking element is corresponding to and connected to the other end of the pogo pin connector. One end of the charging cable is connected to the charging hole of the intelligence loudspeaker box, and the other end of the charging cable is connected to a power unit. When the charging cable is disposed in the charging hole, the charging dock receives electric power transmitted from the intelligence loudspeaker box to make the battery module store the electric power by virtue of the pogo pin connector being connected with the docking element, when the charging cable is removed, the electric power stored by the battery module of the charging dock is able to be provided for the intelligence loudspeaker box to be used by virtue of the pogo pin connector being connected with the docking element.

Another object of the present invention is to provide a charging dock adapted for being applied in an intelligence loudspeaker box. The charging dock includes a lower shell, an upper shell, a battery module, a wireless charging board and a charging cable. A bottom surface of the upper shell is recessed inward to form a cavity. The upper shell is covered on the lower shell to form an accommodating space between the upper shell and the lower shell. A top surface of the upper shell is recessed downward to form a receiving space. The receiving space is equipped with a pogo pin connector. The intelligence loudspeaker box is received in the receiving space. One end of the pogo pin connector is connected to the intelligence loudspeaker box. The battery module is disposed in the accommodating space. The battery module includes a circuit board. A top surface of the circuit board of the battery module is equipped with a docking element projecting beyond the top surface of the circuit board. The docking element is connected to the other end of the pogo pin connector. The wireless charging board is disposed to a bottom surface of the lower shell. The wireless charging board has a charging opening. One end of the charging cable is connected to the charging opening, and the other end of the charging cable is connected to a power unit. When the one end of the charging cable is disposed to and connected to the charging opening, the charging dock receives electric power from the wireless charging board to store the electric power to the battery module, when the charging cable is removed, the electric power of the battery module is provided for the intelligence loudspeaker box to be used.

Another object of the present invention is to provide a charging dock adapted for being applied in an intelligence loudspeaker box. The charging dock includes a shell, a battery module and a locating element. A top surface of the shell is recessed downward to form a receiving space. An inside of the shell has a through hole located under and communicated with the receiving space. The intelligence loudspeaker box is received in the receiving space. The receiving space is equipped with a pogo pin connector. The pogo pin connector projects beyond an upper surface of the shell and projects into the receiving space. One end of the pogo pin connector is connected to the intelligence loudspeaker box. The battery module is disposed in the inside of the shell. The battery module includes a circuit board, and at least one battery disposed to one side of a bottom surface of the circuit board. A middle of the circuit board has an aperture penetrating through the circuit board along an up-down direction. The aperture is corresponding to the through hole. A top surface of the circuit board is equipped with a docking element extending upward and projecting beyond the top surface of the circuit board. The docking element is corresponding to and connected to the other end of the pogo pin connector. The locating element is disposed in the shell. The locating element penetrates through the aperture, and then the locating element passes through the through hole. The locating element projects beyond the upper surface of the shell and projects into the receiving space. When the charging dock is electrically connected with a power unit, the charging dock receives electric power from the power unit to store the electric power to the battery module, when the charging cable is disconnected from the power unit, the electric power of the battery module is provided for the intelligence loudspeaker box.

As described above, a locating element of the lower shell of the charging dock is locked to and located to the intelligence loudspeaker box to make the intelligence loudspeaker box installed in the charging dock by virtue of an innovative structure design, when the charging cable is disposed to the charging hole, the charging dock receives the electric power from the intelligence loudspeaker box to store the electric power to the battery module, or the wireless charging board is increased to the bottom surface of the lower shell of the charging dock, when the charging cable is disposed to the charging opening, the charging dock receives the electric power from the wireless charging board to make the battery module store the electric power, when the charging cable is removed, the electric power stored in the battery module is provided for the intelligence loudspeaker box to be used. Furthermore, the charging dock still has a BLUETOOTH 5.0 function, the charging dock is able to wirelessly charge the intelligence loudspeaker box and is able to realize a one-to-many connection. As a result, the charging dock applied in the intelligence loudspeaker box is convenient to be used and carried.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
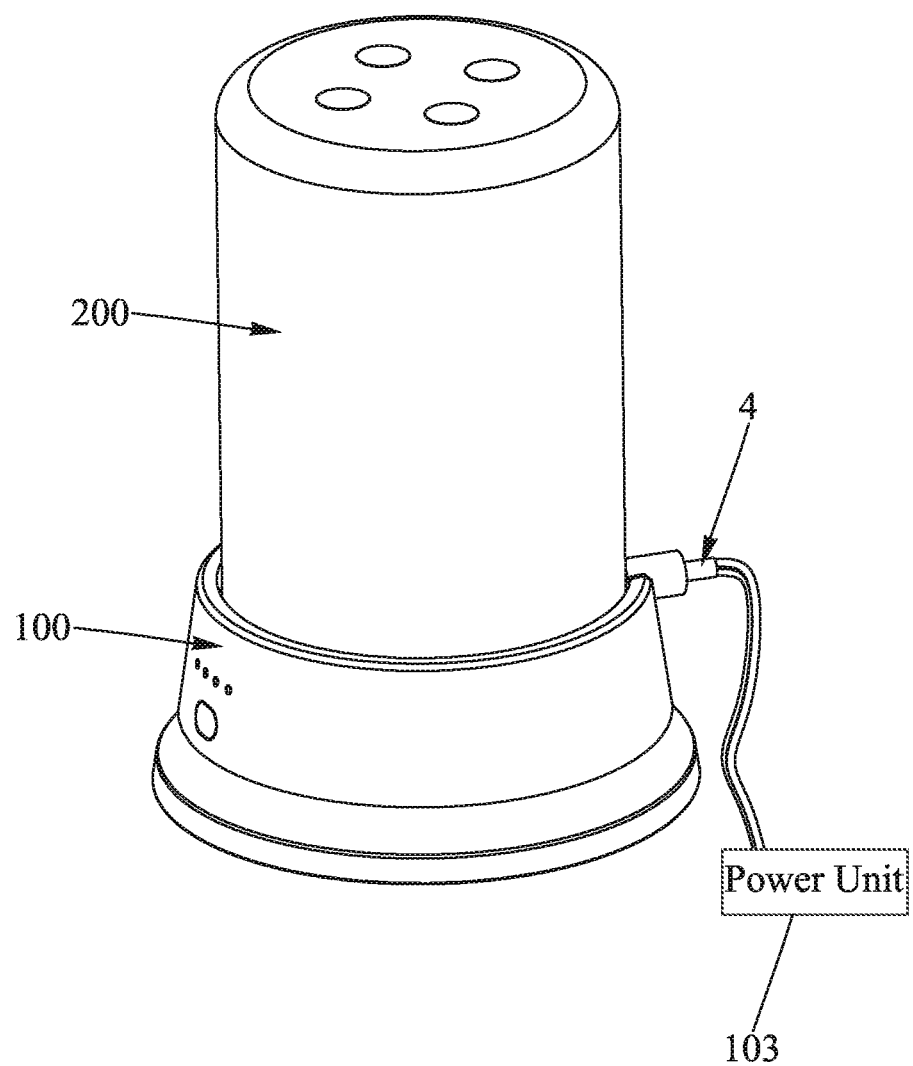
FIG. 1 is a perspective view of a charging dock in accordance with a first preferred embodiment of the present invention, wherein the charging dock is cooperated with an intelligence loudspeaker box.
Figure 2:
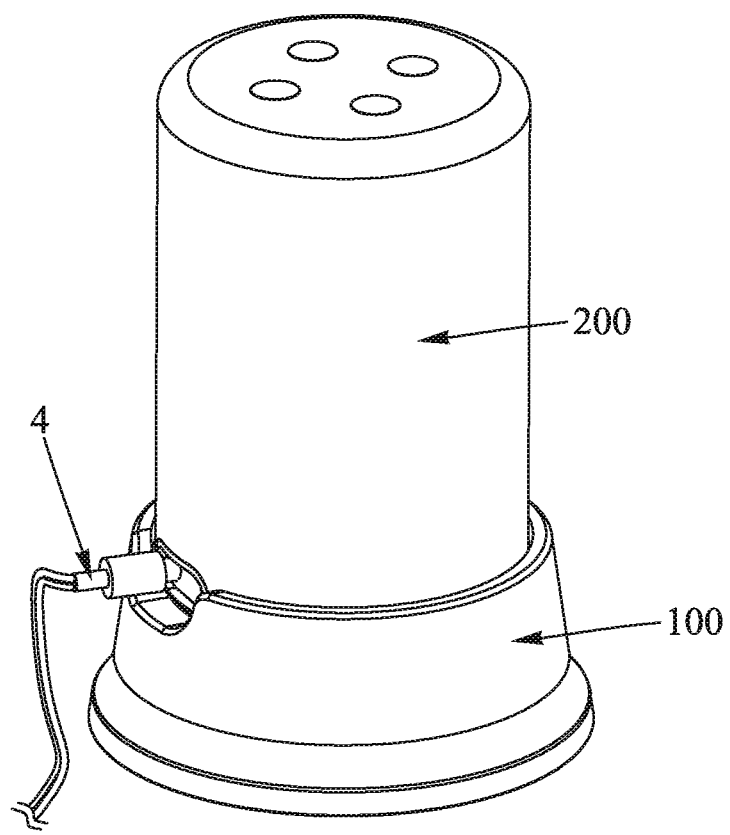
FIG. 2 is another perspective view of the charging dock in accordance with the first preferred embodiment of the present invention, wherein the charging dock is cooperated with the intelligence loudspeaker box.
Figure 3:
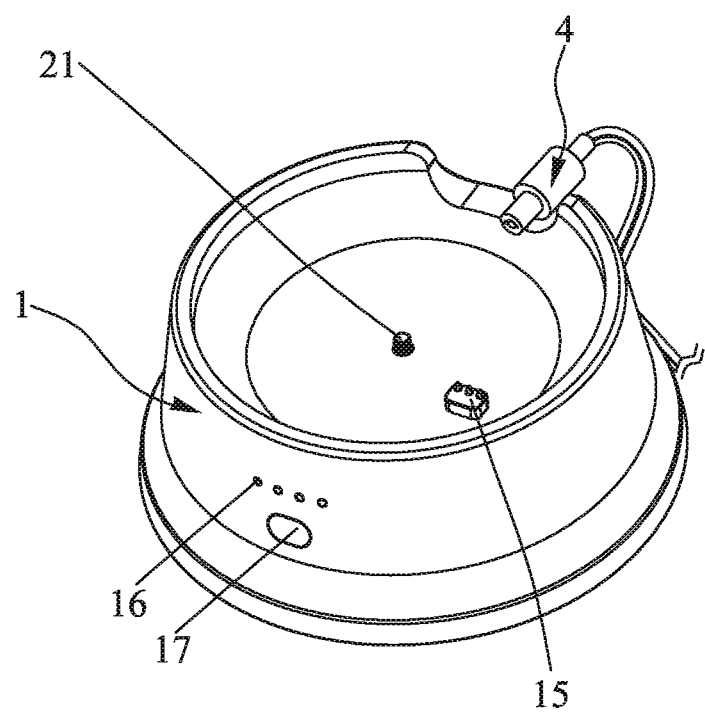
FIG. 3 is a perspective view of the charging dock in accordance with the first preferred embodiment of the present invention.
Figure 4:
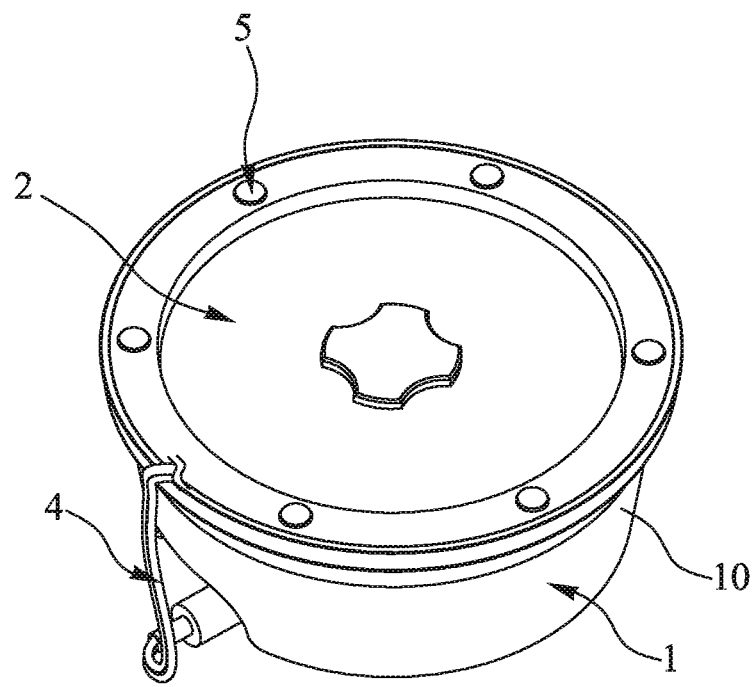
FIG. 4 is another perspective view of the charging dock of FIG. 3.
Figure 8:
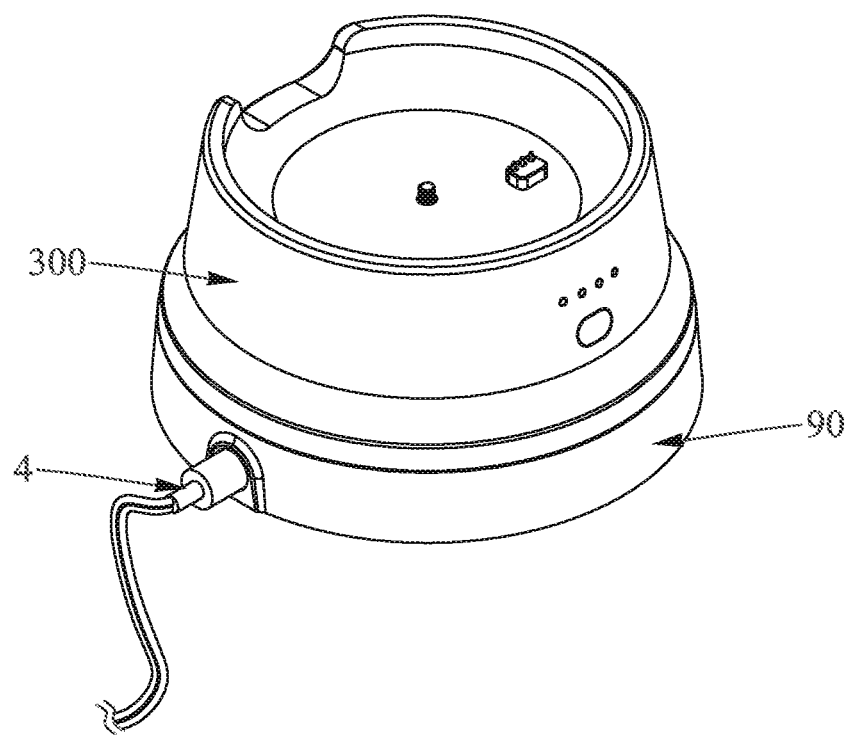
FIG. 8 is a perspective view of the charging dock in accordance with a second preferred embodiment of the present invention.

With reference to FIG. 1, FIG. 2 and FIG. 8, a charging dock 100 cooperated with an intelligence loudspeaker box 200 in accordance with a first preferred embodiment of the present invention is shown. The charging dock 100 is adapted for being applied in the intelligence loudspeaker box 200. The charging dock 100 is disposed under the intelligence loudspeaker box 200, and the charging dock 100 is matched with the intelligence loudspeaker box 200 to be used. In a concrete implementation, the charging dock 100 is also able to be used by virtue of the charging dock 100 being matched with other type devices which are different from the intelligence loudspeaker box 200.

Referring to FIG. 1 to FIG. 7, the charging dock 100 includes an upper shell 1, a lower shell 2, a battery module 3, a charging cable 4, and a plurality of pads 5. The upper shell 1 is shown as a hollow shape. A middle of a bottom surface of the upper shell 1 is recessed inward to form a cavity 102. The upper shell 1 is covered on the lower shell 2 to form an accommodating space 101 between the upper shell 1 and the lower shell 2. The upper shell 1 and the lower shell 2 are buckled with each other to form a shell 10 between the upper shell 1 and the lower shell 2, so the shell 10 includes the upper shell 1 and the lower shell 2. An inside of the shell 10 defines the accommodating space 101. The battery module 3 is disposed in the accommodating space 101. One end of the charging cable 4 is disposed to and connected with a corresponding mechanism of the intelligence loudspeaker box 200, and the other end of the charging cable 4 is connected to a power unit 103. In the first preferred embodiment, the power unit 103 is able to be the power supply to provide electric power for the intelligence loudspeaker box 200 directly, and then the intelligence loudspeaker box 200 transmits the electric power to the charging dock 100. The plurality of the pads 5 are disposed under a bottom surface of the lower shell 2. The battery module 3 is able to store the electric power.

The intelligence loudspeaker box 200 has a charging hole 201, a location hole 202 and a transmission hole 203. A lower portion of one side of the intelligence loudspeaker box 200 defines the charging hole 201. A middle and one side of a bottom surface 204 of the intelligence loudspeaker box 200 define the location hole 202 and the transmission hole 203, respectively. The one end of the charging cable 4 is connected to the charging hole 201 of the intelligence loudspeaker box 200. The location hole 202 is disposed at the middle of the bottom surface 204 of the intelligence loudspeaker box 200. The location hole 202 is a through-hole. The location hole 202 is used for being fastened to a corresponding structure of the lower shell 2 to realize locating and fixing the charging dock 100 and the intelligence loudspeaker box 200. The one side of the bottom surface 204 of the intelligence loudspeaker box 200 is recessed inward to form the transmission hole 203. The transmission hole 203 is connected to a corresponding portion of the upper shell 1.

Referring to FIG. 5 to FIG. 9, a middle of a top surface of the shell 10 is recessed downward to form a receiving space 11. The upper shell 1 has the receiving space 11, a peripheral wall 12, a base 13, a through hole 14, a pogo pin connector 15, a power indicator 16, a power switch 17, a plurality of hollow first location pillars 18 and a plurality of hollow second location pillars 19. A middle of a top surface of the upper shell 1 is recessed downward to form the receiving space 11. The receiving space 11 is equipped with the pogo pin connector 15. The pogo pin connector 15 projects beyond an upper surface of the shell 10 and projects into the receiving space 11. The peripheral wall 12 is connected with a periphery of the base 13 to form the receiving space 11 surrounded between an upper portion of an inner surface of the peripheral wall 12 and a top surface of the base 13. The intelligence loudspeaker box 200 is received in the receiving space 11 of the upper shell 1. A middle of the base 13 of the upper shell 1 has the through hole 14. The inside of the shell 10 has the through hole 14 located under and communicated with the receiving space 11. The through hole 14 is corresponding to a position of the location hole 202 of the intelligence loudspeaker box 200. A corresponding structure of the lower shell 2 penetrates through the through hole 14 and is partially exposed out of the through hole 14 of the upper shell 1.

The pogo pin connector 15 penetrates through the base 13 of the upper shell 1, and the pogo pin connector 15 is partially exposed out from the top surface of the base 13 of the upper shell 1. One end of the pogo pin connector 15 is exposed out from the top surface of the base 13 of the upper shell 1 and is connected to a section of the intelligence loudspeaker box 200, and the other end of the pogo pin connector 15 is connected to a corresponding part of the battery module 3. The one end of the pogo pin connector 15 is connected to the transmission hole 203 of the intelligence loudspeaker box 200. Therefore, the electric power is transmitted to the charging dock 100 from the intelligence loudspeaker box 200. The one end of the charging cable 4 is disposed in the charging hole 201 of the intelligence loudspeaker box 200, the pogo pin connector 15 is connected to the corresponding part of the battery module 3 to make the battery module 3 be able to store the electric power.

The power indicator 16 is disposed to a side surface of the upper shell 1. The charging dock 100 includes a plurality of power indicators 16. The plurality of the power indicators 16 are disposed to the side surface of the upper shell 1. The plurality of the power indicators 16 are abreast disposed for displaying the electric power of the charging dock 100. The power indicator 16 is used for displaying the electric power of the charging dock 100. The power switch 17 is disposed to the side surface of the upper shell 1 and is located under the power indicator 16. The power switch 17 is disposed to the side surface of the upper shell 1 and is located under the plurality of the power indicator 16.

Several portions of an inner periphery of a lower surface of the upper shell 1 extend downward to form the plurality of the first location pillars 18 and the plurality of the second location pillars 19. The plurality of the second location pillars 19 are located above the plurality of the first location pillars 18. The plurality of the first location pillars 18 and the plurality of the second location pillars 19 penetrate through bottoms of the plurality of the first location pillars 18 and the plurality of the second location pillars 19. The plurality of the first location pillars 18 are disposed around outsides of the second location pillars 19. The plurality of the second location pillars 19 are located among the plurality of the first location pillars 18. Corresponding sections of the lower shell 2 are locked to the plurality of the first location pillars 18 to fasten the upper shell 1 and the lower shell 2. Corresponding positions of the battery module 3 are locked to the plurality of the second location pillars 19 to fasten the upper shell 1 and the battery module 3.

Figure 5:
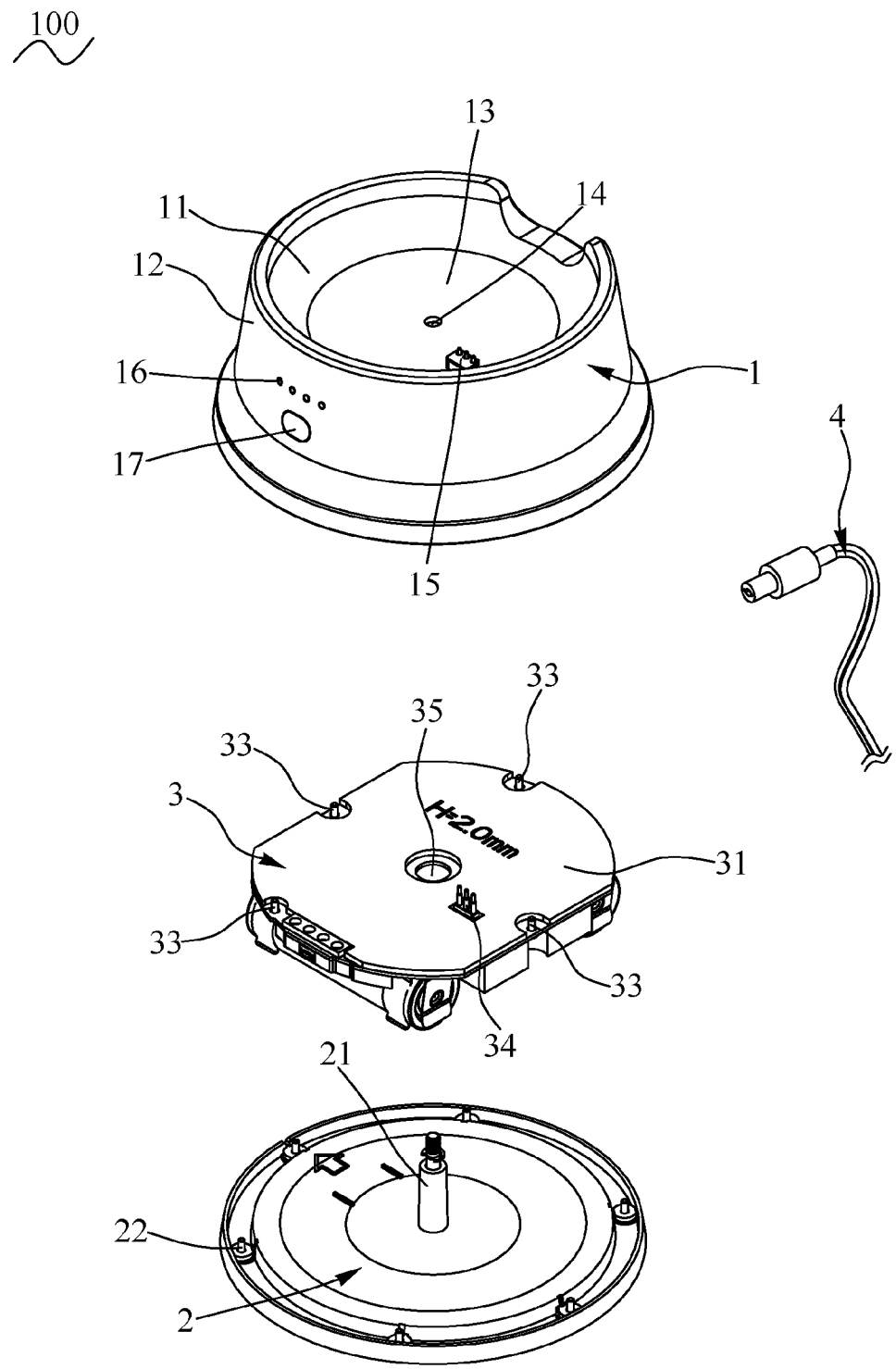
FIG. 5 is an exploded view of the charging dock of FIG. 3.
Figure 6:
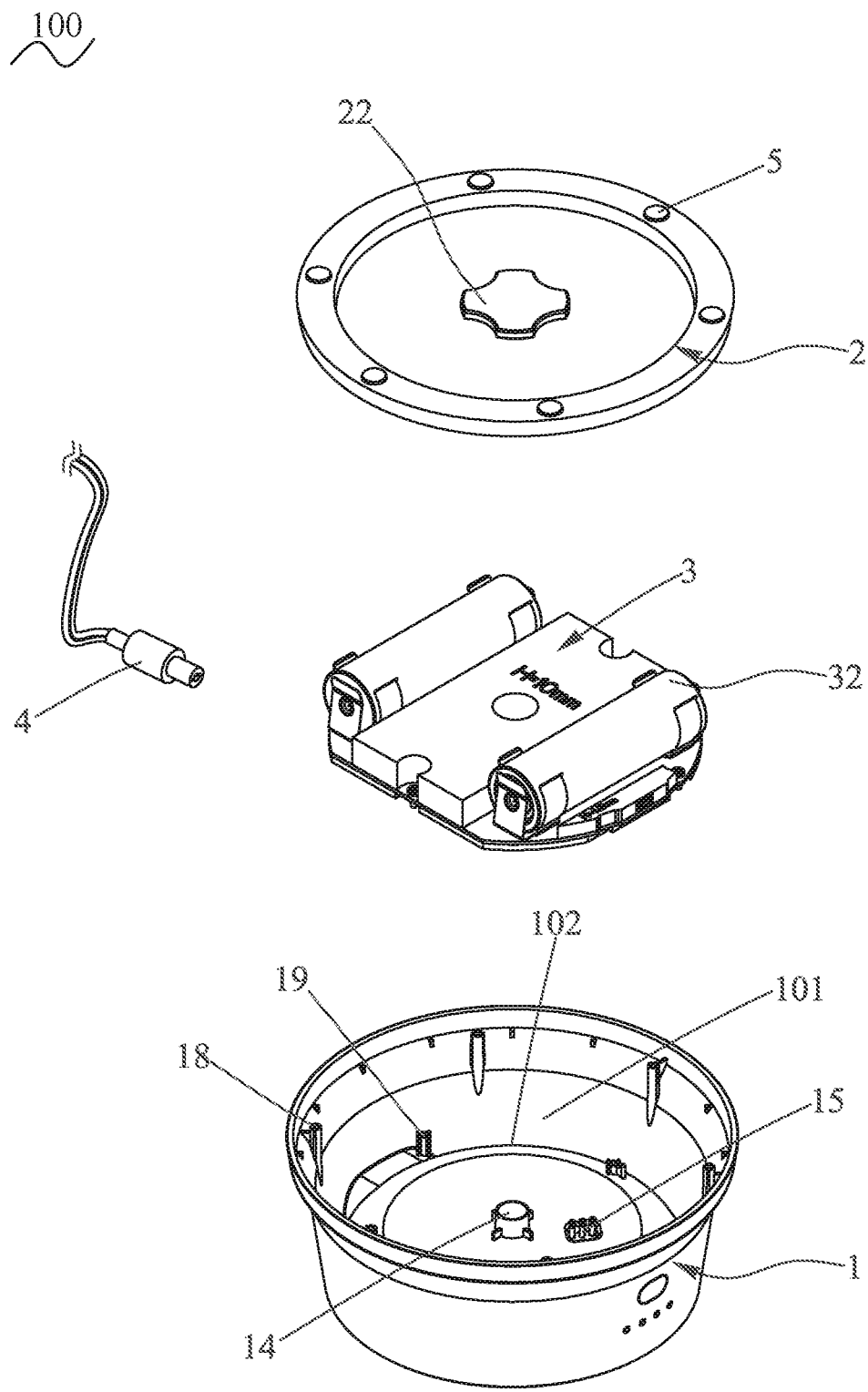
FIG. 6 is another exploded view of the charging dock of FIG. 3.
Figure 7:
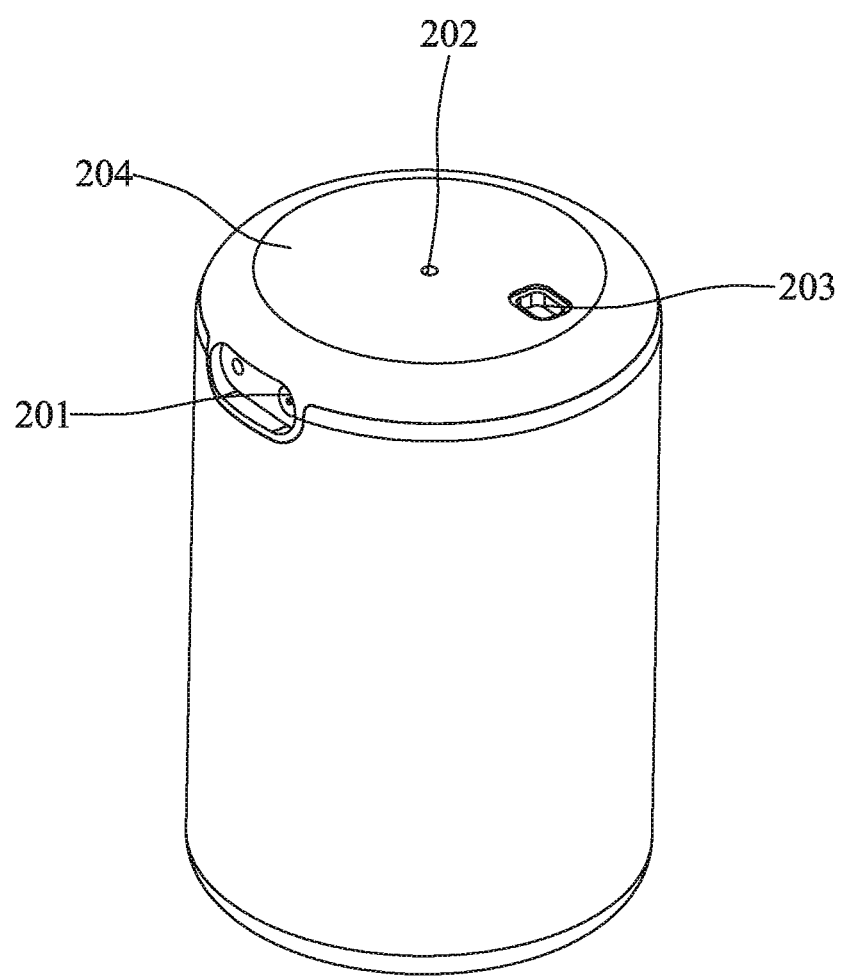
FIG. 7 is a perspective view of the intelligence loudspeaker box of FIG. 1.

Referring to FIG. 1, FIG. 5 and FIG. 6, the lower shell 2 is equipped with a locating element 21 and a plurality of first locking elements 22. The locating element 21 is disposed to a middle of an upper surface of the lower shell 2. The locating element 21 penetrates through a corresponding hole of the battery module 3, and then is fastened in the through hole 14 and is partially exposed out of the base 13 of the upper shell 1 from the through hole 14. The locating element 21 is used for locating and locking the intelligence loudspeaker box 200 to the charging dock 100. In the first preferred embodiment, the locating element 21 and the plurality of the first locking elements 22 are screws. The plurality of the first locking elements 22 are disposed to an outer periphery of the upper surface of the lower shell 2. The plurality of the first locking elements 22 of the lower shell 2 are locked to the plurality of the first location pillars 18 of the upper shell 1 to realize that the upper shell 1 and the lower shell 2 are buckled with each other. In the concrete implementation, the locating element 21 and the plurality of the first locking elements 22 are also able to be other type components.

The battery module 3 includes a circuit board 31, at least one battery 32, a plurality of second locking elements 33, a docking element 34 and an aperture 35. The at least one battery 32 is disposed to one side of a bottom surface of the circuit board 31. The at least one battery 32 stores the electric power to be able to provide the electric power for the charging dock 100 so as to make the charging dock 100 uses the electric power at any time. The plurality of the second locking elements 33 are disposed on an outer periphery of a top surface of the circuit board 31. The plurality of the second locking elements 33 are used for being locked in the plurality of the second location pillars 19 to realize that the upper shell 1 and the battery module 3 are buckled with each other. The plurality of the second locking elements 33 are locked in the plurality of the second location pillars 19. A top surface of the battery module 3 is equipped with the docking element 34 extending upward. One side of the top surface of the circuit board 31 of the battery module 3 is equipped with the docking element 34 extending upward and projecting beyond the top surface of the circuit board 31.

The docking element 34 is corresponding to and connected to the other end of the pogo pin connector 15. A middle of the battery module 3 has the aperture 35 penetrating through the battery module 3 along an up-down direction. The aperture 35 is disposed in a middle of the circuit board 31 of the battery module 3. The middle of the circuit board 31 has the aperture 35 penetrating through the circuit board 31 along the up-down direction. The aperture 35 is corresponding to the through hole 14 of the upper shell 1 and the locating element 21 of the lower shell 2. When the charging cable 4 is disposed in the charging hole 201, the charging dock 100 receives the electric power transmitted from the intelligence loudspeaker box 200 to make the battery module 3 store the electric power by virtue of the pogo pin connector 15 being connected with the docking element 34. When the charging cable 4 is removed from the power unit 103, the electric power stored by the battery module 3 of the charging dock 100 is able to be provided for the intelligence loudspeaker box 200 to be used by virtue of the pogo pin connector 15 being connected with the docking element 34.

The locating element 21 is disposed in the shell 10. The locating element 21 penetrates through the aperture 35, and then the locating element 21 passes through the through hole 14. The locating element 21 projects beyond the upper surface of the shell 10 and projects into the receiving space 11. The locating element 21 of the lower shell 2 penetrates through the aperture 35, and then the locating element 21 passes through the through hole 14 and projects beyond the top surface of the base 13 of the upper shell 1. The one side of the bottom surface of the circuit board 31 of the battery module 3 is equipped with a plurality of batteries 32. In the first preferred embodiment, the battery module 3 includes two batteries 32. The two batteries 32 are mounted to two sides of the bottom surface of the circuit board 31. When the intelligence loudspeaker box 200 is mounted in the charging dock 100, the locating element 21 is locked to the location hole 202 to realize a location and a fixation between the intelligence loudspeaker box 200 and the charging dock 100.

Figure 9:
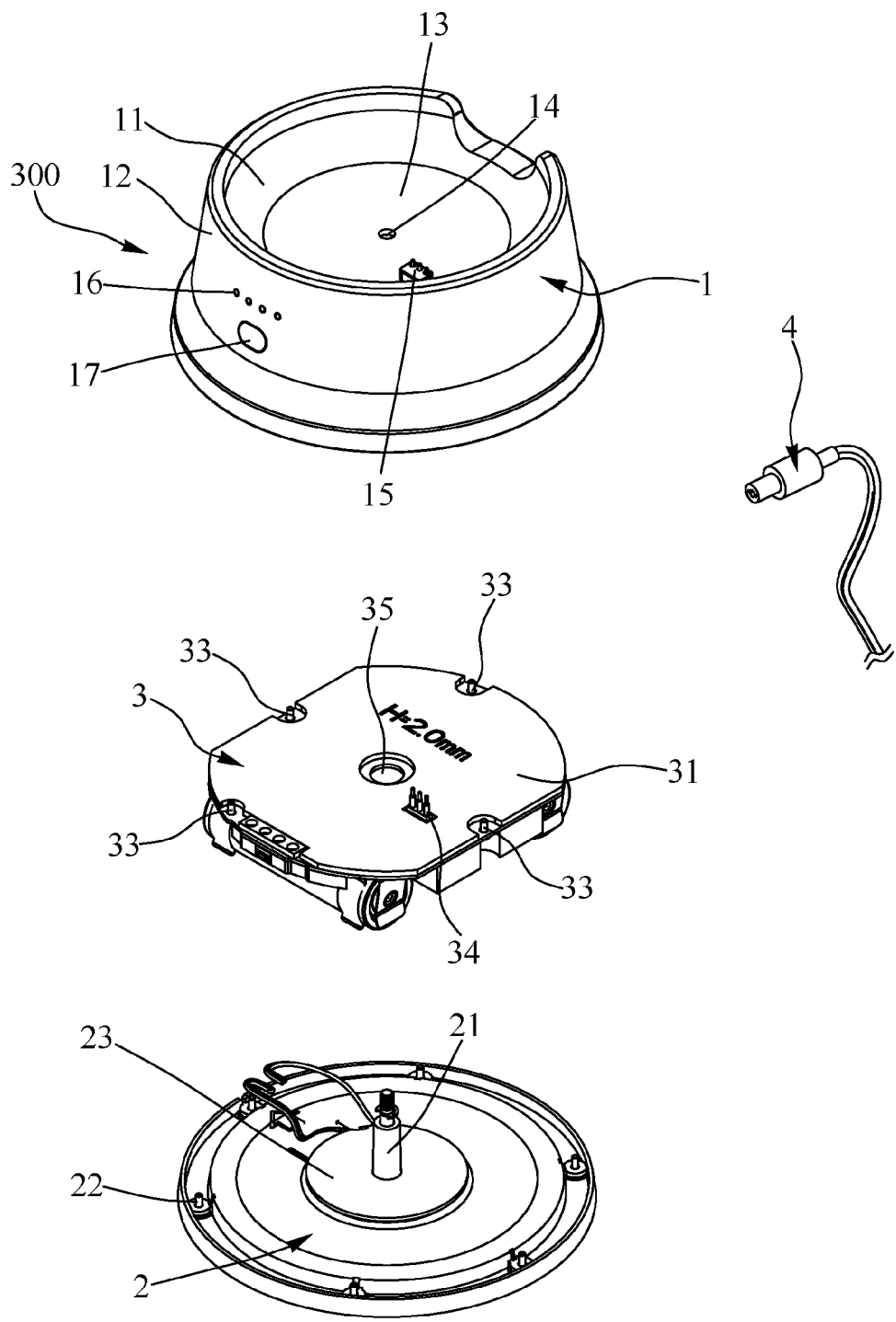
FIG. 9 is a partially exploded view of the charging dock of FIG. 8.
Figure 10:
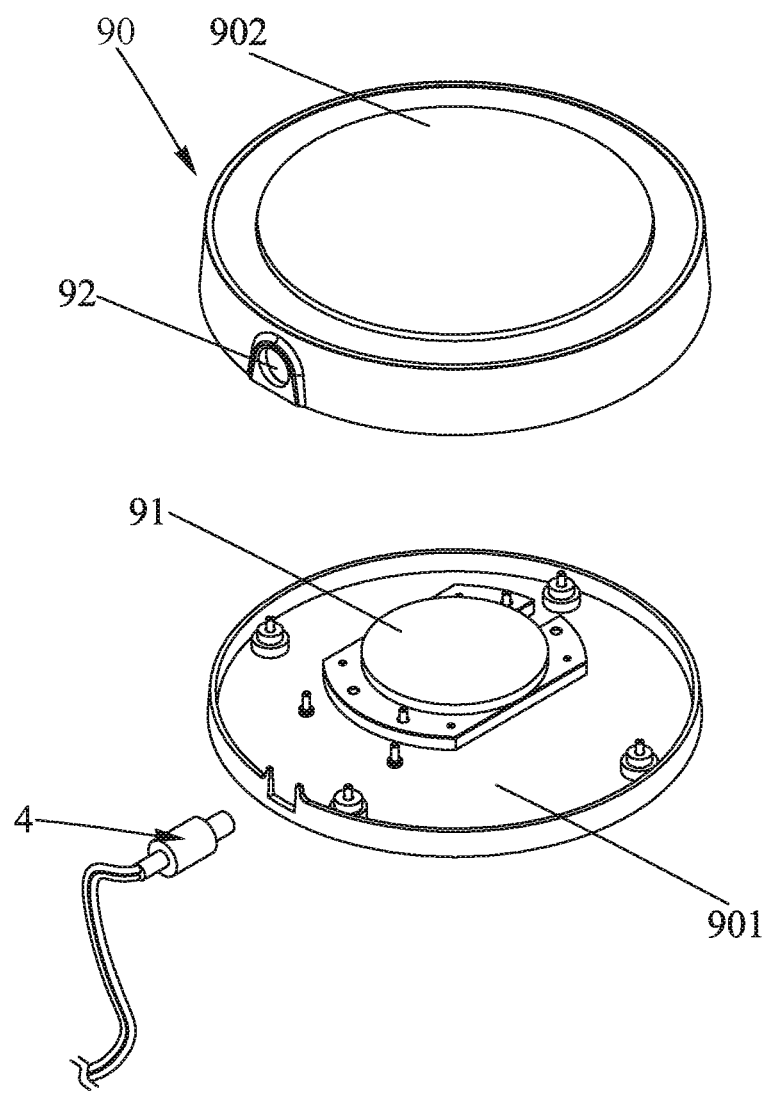
FIG. 10 is an exploded view of a wireless charging board of the charging dock of FIG. 8.

Referring to FIG. 8 to FIG. 10, a charging dock 300 in accordance with a second preferred embodiment of the present invention is shown. Differences between the charging dock 100 in accordance with the first preferred embodiment and the charging dock 300 in accordance with the second preferred embodiment are described as follows. The charging dock 300 includes a wireless charging board 90. The wireless charging board 90 is disposed to a bottom surface of the shell 10. The wireless charging board 90 is disposed to the bottom surface of the lower shell 2 of the charging dock 300. The wireless charging board 90 includes a base 901, a first coil 91 and a cover 902. The cover 902 is hollow with a bottom of the cover 902 being opened freely. The first coil 91 is a transmitting coil, and the first coil 91 is disposed to a middle of an upper surface of the base 901 of the wireless charging board 90.

The wireless charging board 90 has a charging opening 92 defined at one side of the cover 902 of the wireless charging board 90. The first coil 91 is received between the base 901 and the cover 902. A middle of the upper surface of the lower shell 2 of the shell 10 is equipped with a second coil 23, and the second coil 23 is a receiving coil. The first coil 91 is corresponding to the second coil 23. In the second preferred embodiment, when the one end of the charging cable 4 is disposed to and connected to the charging opening 92, the charging dock 300 receives the electric power from the wireless charging board 90 to store the electric power to the battery module 3. When the charging cable 4 is removed, the electric power of the battery module 3 is provided for the intelligence loudspeaker box 200 to be used. In the second preferred embodiment, the power unit 103 is the charging dock 300 which is connected with the power supply.

In the concrete implementation, the charging dock 100 or the charging dock 300 further includes a BLUETOOTH 5.0 chip. The circuit board 31 of the battery module 3 is equipped with the BLUETOOTH 5.0 chip. The blue-tooth 5.0 chip has a higher speed characteristic, a longer transmission distance characteristic, a lower cost characteristic, a lower power consumption characteristic and a one-to-many connection characteristic. The BLUETOOTH 5.0 chip is able to reach the one-to-many connection between the charging dock 100 or the charging dock 300 and the intelligence loudspeaker box 200. The charging dock 100 or the charging dock 300 is able to be connected to a plurality of smart household devices and smart furniture to improve connection quality and an interconnectivity among the plurality of the smart household devices and the smart furniture. Therefore, an equipment with the BLUETOOTH 5.0 chip becomes the best choice of a family internet of things equipment and a commercial internet of things equipment.

In addition, a smart phone is able to be connected with a plurality of the charging docks 100 or a plurality of the charging docks 300, when the plurality of the charging docks 100 or the plurality of the charging docks 300 are matched with a plurality of the intelligence loudspeaker boxes 200 to be used, the plurality of the charging docks 100 or the plurality of the charging docks 300 are equipped with the plurality of the intelligence loudspeaker boxes 200, the plurality of the intelligence loudspeaker boxes 200 are able to form a multichannel home theater or a loudspeaker array, so that a multivariant application of the charging dock 100 or the charging dock 300 is improved.

When the charging dock 100 is electrically connected with the power unit 103, the charging dock 100 receives the electric power from the power unit 103 to store the electric power to the battery module 3, when the charging cable 4 is disconnected from the power unit 103, the electric power of the battery module 3 is provided for the intelligence loudspeaker box 200. The one end of the charging cable 4 is connected to at least one of the intelligence loudspeaker box 200 and the wireless charging board 90 of the charging dock 300. The one end of the charging cable 4 is connected to at least one of the charging opening 92 and the charging hole 201. When the one end of the charging cable 4 is disposed to and connected to the at least one of the intelligence loudspeaker box 200 and the wireless charging board 90 of the charging dock 300, the charging dock 300 receives the electric power from the at least one of the intelligence loudspeaker box 200 and the wireless charging board 90 of the charging dock 300 to store the electric power to the battery module 3, when the charging cable 4 is removed, the electric power of the battery module 3 is provided for the intelligence loudspeaker box 200 to be used.

As described above, the locating element 21 of the lower shell 2 of the charging dock 100 is locked to and located to the intelligence loudspeaker box 200 to make the intelligence loudspeaker box 200 installed in the charging dock 100 by virtue of an innovative structure design, when the charging cable 4 is disposed to the charging hole 201, the charging dock 100 receives the electric power from the intelligence loudspeaker box 200 to store the electric power to the battery module 3, or the wireless charging board 90 is increased to the bottom surface of the lower shell 2 of the charging dock 300, when the charging cable 4 is disposed to the charging opening 92, the charging dock 300 receives the electric power from the wireless charging board 90 to make the battery module 3 store the electric power, when the charging cable 4 is removed, the electric power stored in the battery module 3 is provided for the intelligence loudspeaker box 200 to be used. Furthermore, the charging dock 100 or the charging dock 300 still has a BLUETOOTH 5.0 function, the charging dock 100 or the charging dock 300 is able to wirelessly charge the intelligence loudspeaker box 200 and is able to realize the one-to-many connection. As a result, the charging dock 100 or the charging dock 300 applied in the intelligence loudspeaker box 200 is convenient to be used and carried.

What is claimed is:

1. A charging dock adapted for being applied in an intelligence loudspeaker box, the intelligence loudspeaker box having a charging hole, the charging dock comprising:
   a shell, an inside of the shell defining an accommodating space, a top surface of the shell being recessed downward to form a receiving space, the receiving space being equipped with a pogo pin connector, the intelligence loudspeaker box being received in the receiving space, one end of the pogo pin connector being connected to the intelligence loudspeaker box;
   a battery module disposed in the accommodating space of the inside of the shell, the battery module including a circuit board, a top surface of the circuit board of the battery module being equipped with a docking element extending upward and projecting beyond the top surface of the circuit board, the docking element being corresponding to and connected to the other end of the pogo pin connector; and
   a charging cable, one end of the charging cable being connected to the charging hole of the intelligence loudspeaker box, and the other end of the charging cable being connected to a power unit,
   wherein when the charging cable is disposed in the charging hole, the charging dock receives electric power transmitted from the intelligence loudspeaker box to make the battery module store the electric power by virtue of the pogo pin connector being connected with the docking element, when the charging cable is removed, the electric power stored by the battery module of the charging dock is able to be provided for the intelligence loudspeaker box to be used by virtue of the pogo pin connector being connected with the docking element.

2. The charging dock as claimed in claim 1, wherein the shell includes an upper shell and a lower shell buckled with each other, a top surface of the upper shell is recessed downward to form the receiving space equipped with the pogo pin connector.

3. The charging dock as claimed in claim 2, wherein the upper shell has a peripheral wall and a base, the peripheral wall is connected with a periphery of the base to form the receiving space surrounded between an upper portion of an inner surface of the peripheral wall and a top surface of the base.

4. The charging dock as claimed in claim 2, wherein a middle of a base of the upper shell has a through hole, the lower shell is equipped with a locating element, a middle of the battery module has an aperture penetrating through the battery module along an up-down direction, the aperture is corresponding to the through hole and the locating element, the locating element penetrates through the aperture, and then the locating element passes through the through hole and projects beyond a top surface of the base of the upper shell.

5. The charging dock as claimed in claim 2, wherein the pogo pin connector is partially exposed out from a top surface of a base of the upper shell, the one end of the pogo pin connector is exposed out from the top surface of the base of the upper shell and is connected to the intelligence loudspeaker box.

6. The charging dock as claimed in claim 2, further comprising a plurality of power indicators disposed to a side surface of the upper shell, and a power switch disposed to the side surface of the upper shell and located under the plurality of the power indicators, the plurality of the power indicators being abreast disposed for displaying the electric power of the charging dock.

7. The charging dock as claimed in claim 2, wherein several portions of an inner periphery of a lower surface of the upper shell extend downward to form a plurality of first location pillars and a plurality of second location pillars, the plurality of the first location pillars are disposed around outsides of the second location pillars.

8. The charging dock as claimed in claim 7, wherein the plurality of the second location pillars are located above the plurality of the first location pillars.

9. The charging dock as claimed in claim 8, wherein the lower shell is equipped with a locating element, the locating element is disposed to a middle of an upper surface of the lower shell, a middle of a base of the upper shell has a through hole, the locating element is fastened in the through hole and is partially exposed out of the base of the upper shell from the through hole.

10. The charging dock as claimed in claim 8, wherein the lower shell is equipped with a plurality of first locking elements, the plurality of the first locking elements are disposed to an outer periphery of an upper surface of the lower shell, the plurality of the first locking elements are locked to the plurality of the first location pillars to fasten the upper shell and the lower shell.

11. The charging dock as claimed in claim 10, wherein the battery module includes a plurality of second locking elements, one side of a bottom surface of the circuit board is equipped with a plurality of batteries, the plurality of the second locking elements are disposed on an outer periphery of the top surface of the circuit board, the plurality of the second locking elements are locked in the plurality of the second location pillars.

12. The charging dock as claimed in claim 2, further comprising a plurality of pads disposed under a bottom surface of the lower shell.

13. The charging dock as claimed in claim 2, further comprising a wireless charging board disposed to a bottom surface of the lower shell, the wireless charging board including a base, a first coil and a cover, the first coil being a transmitting coil, the wireless charging board having a charging opening defined at one side of the cover, the first coil being received between the base and the cover, the lower shell being equipped with a second coil, and the second coil being a receiving coil, the first coil being corresponding to the second coil.

14. The charging dock as claimed in claim 13, wherein the one end of the charging cable is connected to the charging opening, and the other end of the charging cable is connected to the power unit.

15. The charging dock as claimed in claim 1, wherein the circuit board of the battery module is equipped with a wireless communication chip.

* * * * *